July 12, 1927.
J. M. CRAWFORD
CLOSED BODY VENTILATOR
Filed Sept. 11, 1924
1,635,609
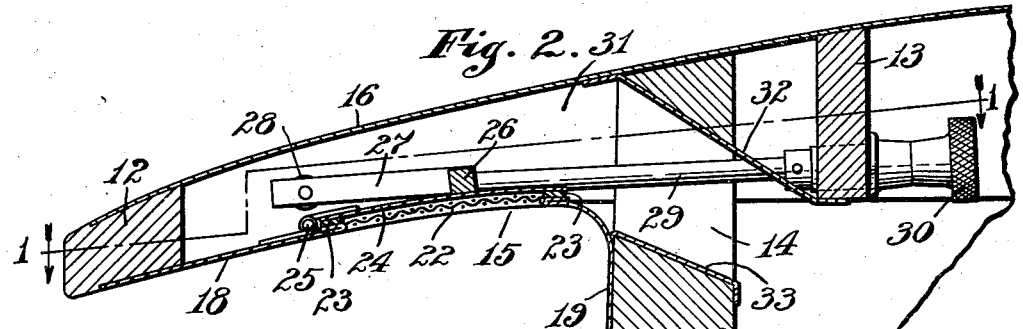
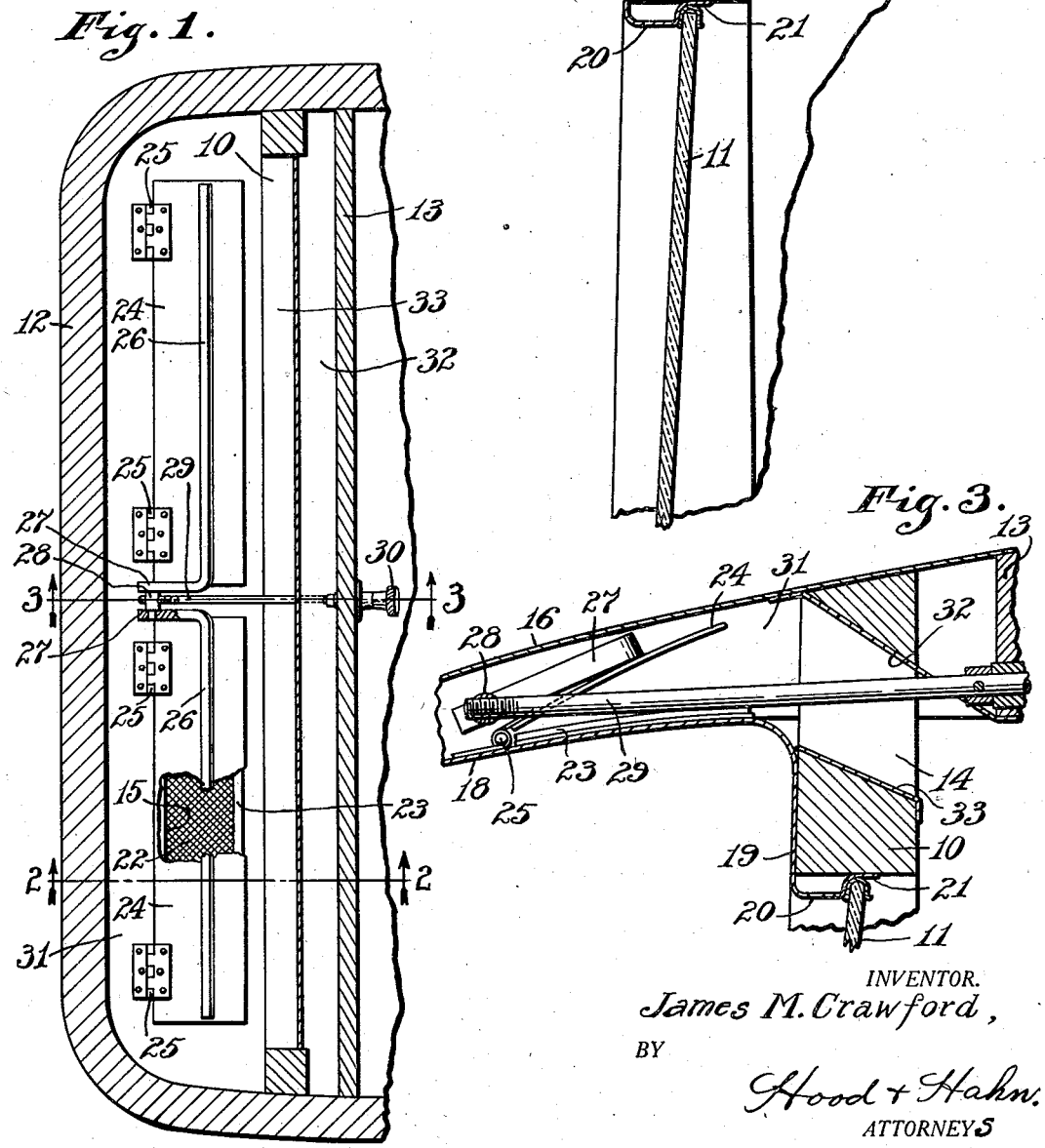
INVENTOR.
James M. Crawford,
BY
Hood + Hahn.
ATTORNEYS Patented July 12, 1927.

1,635,609

UNITED STATES PATENT OFFICE.

JAMES M. CRAWFORD, OF AUBURN, INDIANA, ASSIGNOR TO AUBURN AUTOMOBILE COMPANY, OF AUBURN, INDIANA, A CORPORATION OF INDIANA.

CLOSED-BODY VENTILATOR.

Application filed September 11, 1924. Serial No. 737,070.

The object of my invention is to produce an efficient ventilator for automobile car bodies, especially of the closed body type.

The accompanying drawings illustrate my invention.

Fig. 1 is a horizontal section on line 1—1 of Fig. 2.

Fig. 2 a vertical section on line 2—2 of Fig. 1.

Fig. 3 a fragmentary vertical section on line 3—3 of Fig. 1.

In the drawings 10 indicates the front wall or wind shield frame of an automobile body and comprising the glass plate 11, and 12 and 13 indicate cross bars forming part of the canopy frame.

My improvement consists primarily of an air passage 14, leading through the upper part of the front wall 10, and a screened and valved inlet passage 15 arranged in front of the front wall 10, preferably within the overhanging portion of the canopy, and means by which the valve may be readily adjusted.

In order that the structure may be cheaply produced so as to be water tight, and air tight when desired, I have provided the following construction. A metal cover 16, at least at the forward end of the canopy, is secured to the front bow 12, and a second bottom cover 18 is provided to form the under face of the forwardly projecting overhanging portion of the canopy, thence at 19 to form a depending portion as a facing for the upper part of front wall 10, and thence rearwardly at 20 to form a seat 21 for the upper edge of the glass 11. Closely adjacent the corner formed by parts 18 and 19, part 18 is perforated to form the air inlet 15, preferably by two slightly transversely separated perforations each of which is screened with a screen 22 and flanked with a gasket 23.

Normally lying upon each gasket 23 is a valve plate 24 hinged, at 25, at its forward edge. Each plate 24 is provided with a longitudinal brace 26 having a forwardly extended arm 27, the end of which is spaced from the axis of hinge 25. Journaled between the ends of arms 27 is a cross pin 28 having a diametrical threaded opening into which is projected the threaded forward end of a controlling shaft 29 journaled in cross bar 13 and provided with a suitable knurled head 30 by which it may be readily operated.

Sheets 16 and 18, bent as described, form an air chamber 31 within which the controlling valve mechanism is mounted and communicates with passage 14, said passage being preferably defined by upper and lower plates 32 and 33 preferably spot welded to sheet 16 and so arranged as to direct an air current onto the occupants of the front seat at about the chest level.

Movement of the car forwardly produces a compression of air in the corner between the canopy overhang and the front wall and this compression facilitates the delivery of air through the screened openings 15 and passage 14 into the interior of the car, and by mounting the valve 24 within chamber 31, it is thoroughly guarded from harm and at the same time, out of sight.

I claim as my invention:

1. In an automobile body, the combination of the front wall, the canopy frame, a canopy sheet covering for said canopy frame forward of the front wall and perforated in its under portion adjacent the front wall, and having a depending portion facing the upper portion of the front wall and forming a seat for the glass of said front wall, and an adjustable valve arranged to co-operate with said perforation.

2. In an automobile body, the combination of the front wall, the canopy frame, a canopy sheet covering for said canopy frame forward of the front wall and perforated in its under portion adjacent the front wall and having a depending portion facing the upper portion of the front wall and forming a seat for the glass of said front wall, a valve plate mounted within the chamber over said perforation, and means by which said valve plate may be adjusted.

3. In an automobile body, the combination of the front wall, the canopy frame, a canopy sheet covering for said canopy frame forward of the front wall and perforated in its under portion adjacent the front wall and having a depending portion facing the upper portion of the front wall and forming a seat for the glass of said front wall, a valve plate mounted within the chamber over said perforation and hinged at its forward edge, and means by which said valve plate may be adjusted.

In witness whereof I, JAMES M. CRAWFORD, have hereunto set my hand at Auburn, Indiana, this 23 day of July 1924, A. D. one thousand nine hundred and twenty four.

JAMES M. CRAWFORD.